Figure 1:
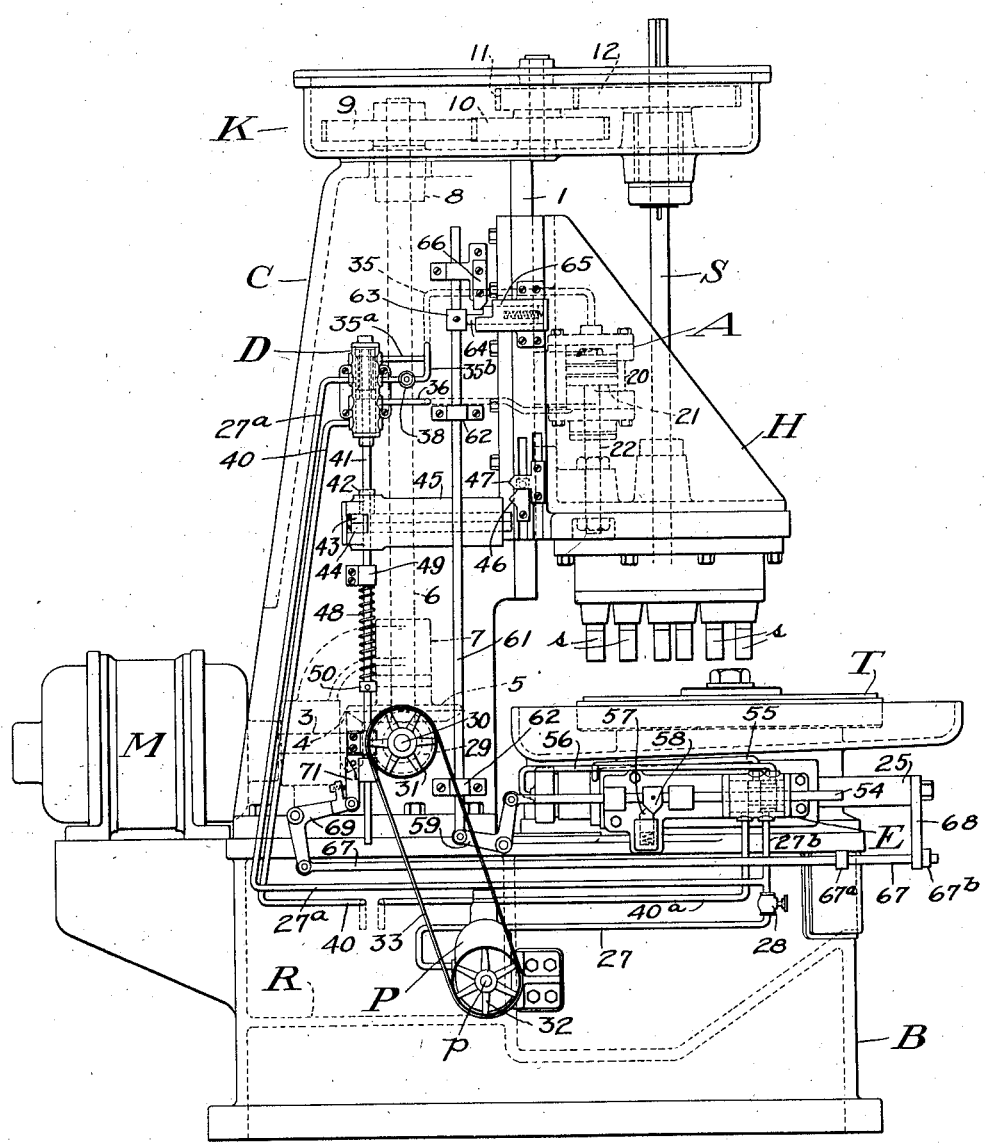

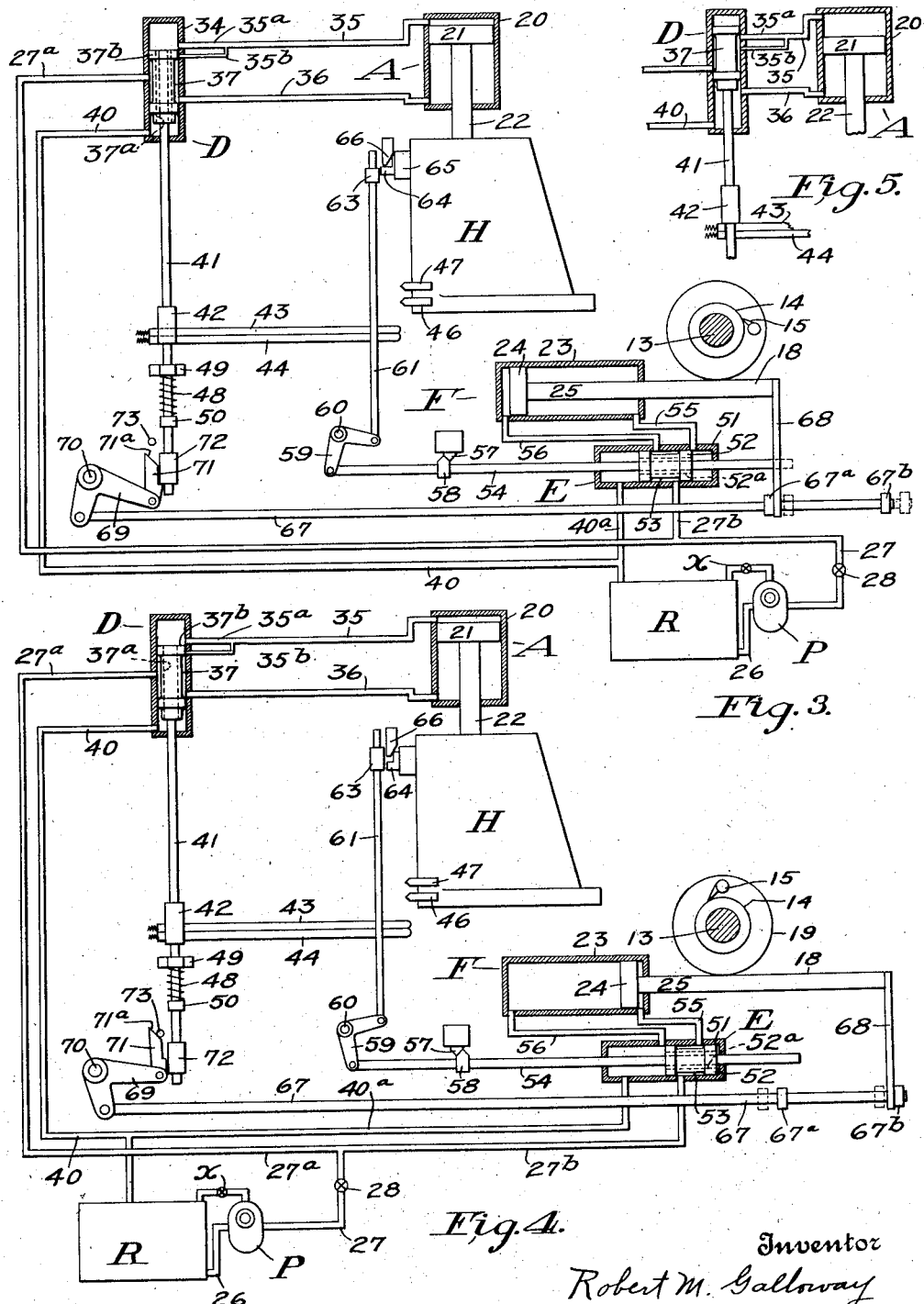

Patented Aug. 4, 1931

1,817,552

UNITED STATES PATENT OFFICE

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA

CONTINUOUS AUTOMATIC HYDRAULIC MACHINE

Application filed December 23, 1927. Serial No. 242,059.

This invention deals with machine tools and it aims to render available a machine tool capable of operating continuously with a maxium degree of efficiency, and with a minimum amount of care, attention and labor on the part of the operator. In other words, the invention relates primarily to a machine tool adapted particularly for quantity production, and to that end the invention has for an object to provide a machine tool in which harsh movements, such as are common to mechanical drives and reversing mechanisms, are eliminated; in which the movements of the parts are so timed and co-ordinated that a minimum amount of time is lost between successive operations; in which all of the movements are automatically controlled; and in the operation of which the operator is required only to place and remove the work-pieces.

A further object of the invention is to provide, in a machine tool, an improved hydraulic system for producing the relative bodily movements between the tool (or tools) and the work.

Another object is to provide an improved automatic control for the hydraulic system, whereby the various mechanisms actuated thereby are brought into operation at precisely the right time, and by means of which absolute synchronism between the various movable parts is insured.

More specifically stated, an object of this invention is to provide a continuously operating hydraulically actuated machine tool having a reciprocating tool-head, a step-by-step movable work-carrier and automatically controlled means for rendering effective the hydraulic means alternately to reciprocate the tool-head and to shift the work-carrier, whereby, in the operation of the machine, the operator is required only to place unfinished work-pieces on the work-carrier and to move the finished work therefrom.

These objects have been attained by embodying in a machine tool, a reciprocatory tool-head; a step-by-step rotary work-carrier, adapted to present work-pieces to the action of tools carried by the tool-head; hydraulically actuated means for reciprocating the tool-holder; and hydraulically actuated index mechanism for shifting the work-carrier. Fluid pressure, to actuate the tool-head and the work-carrier, is provided by a hydraulic system embodied wholly within the machine tool and comprises a continuously acting pump adapted to deliver oil, or other suitable fluid, at a volumetrically uniform rate, in amount sufficient to actuate both the tool-head and the work-carrier. A plural-branch conduit serves to connect the pump with a reservoir embodied in the machine and with the hydraulic motors which translate the tool-head and index the work-carrier. To limit the maximum pressure in the hydraulic system, the system is provided with a suitable relief valve which returns to the reservoir the surplus oil passed by the pump, after a predetermined maximum pressure has been attained. Suitable valves also are provided for controlling the action of the tool-head translating means and the indexing mechanism, and to maintain the two in proper synchronism, and to effect continuous operation of the machine automatic valve actuating means are provided whereby the movement of the tool-head causes the index mechanism to be rendered effective, and actuation of the index mechanism initiates a movement of the tool-head.

Although the tool-head is herein shown and described as the translatable member and the work-holder as the step-by-step shiftable member, it is to be understood that this invention is in no-wise limited to this particular construction and that other arrangements are contemplated. It is also to be understood that although oil is specified as the preferred fluid for use in the hydraulic system any other suitable fluid might be employed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
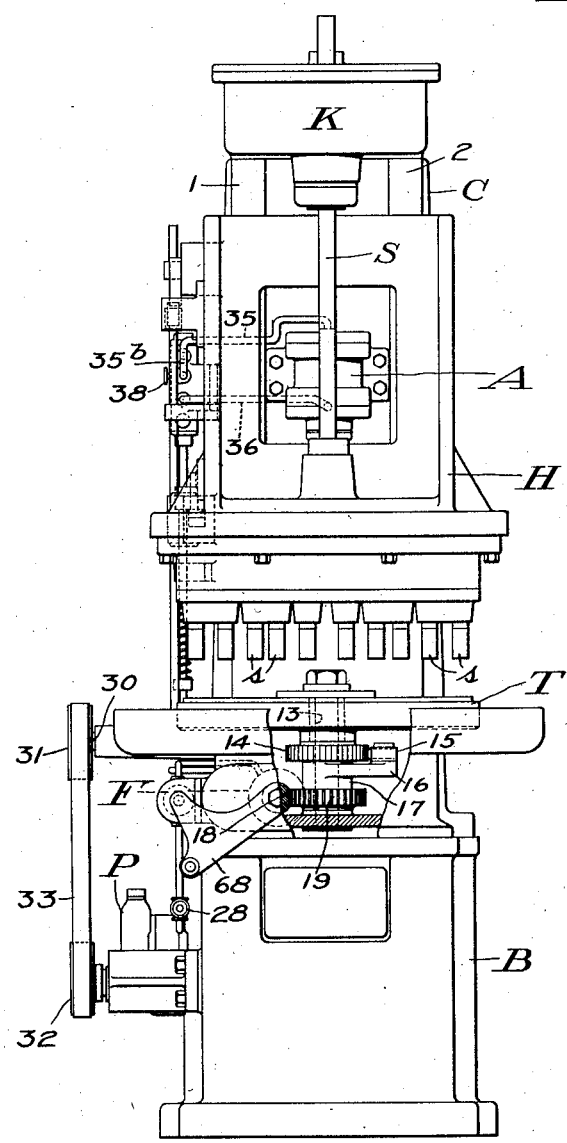

Figure 1 is a side elevation of a multiple spindle drilling machine embodying the present invention. Fig. 2 is a front elevation of the machine illustrated in Fig. 1, with a portion thereof broken away, better to disclose the table indexing mechanism. Figs. 3 and 4 are diagrammatic views illustrating the improved hydraulic system and the control means therefor. Fig. 5 is a detail of the tool-head control valve and parts associated therewith.

Referring more specifically to the drawings, the invention is disclosed as embodied in a multiple spindle drilling machine comprising a base B and an upright column C secured upon the base and providing spaced ways 1 and 2, upon which is translatably mounted a tool-head H. Rotatably mounted upon the base B, beneath the tool-head, is a work-carrier T upon which work-pieces may be secured in any suitable or desired manner. In the embodiment of the invention illustrated, the tool-head carries a plurality of rotatable drill spindles s which may be driven by any suitable means. Inasmuch as the specific means for rotating the spindles forms no part of this invention detailed illustration and description thereof is deemed unnnecessary. It will suffice to state that they are driven from a master spindle S journaled in the tool-head and extending upwardly therefrom. Power to rotate the master spindle preferably is provided by an electric motor M mounted on the base B. The shaft 3 of the motor is connected, through bevel gears 4 and 5, with an upright shaft 6 journaled in bearings 7 and 8 provided by the column C. Upon the upper end of the shaft 6, and within a casing K, secured upon the column C, there is secured a gear 9, which, through gears 10 and 11, transmits rotary motion to a gear 12 having a splined connection with the master spindle S. Through the splined connection between the gear 12 and the master spindle S the latter is permitted to move up and down with the tool-head and yet be maintained in constant rotation by the gear 12.

The work-carrier T is preferably in the form of a rotatable table and means is provided for giving to this table step-by-step rotary movements to present the work-pieces, carried thereby, to the action of drills (not shown) supported by the spindles s. The table T is preferably secured upon a stub shaft 13 journaled in the base B. To effect step-by-step rotary movements of the table there is secured to shaft 13 a ratchet-wheel 14 adapted to be engaged by a pawl 15, carried by an arm 16 projecting laterally from a sleeve 17, journaled upon the shaft 13. Oscillatory movements are given to the sleeve 17 and arm 16, alternately to retract and advance the pawl 15, by a reciprocatory rack-bar 18, the teeth of which mesh with the teeth of a pinion 19 fixed upon the sleeve 17. Any suitable means may be provided to hold the work-carrier against retrograde movement and to maintain it in a fixed position during the drilling operation.

As hereinbefore stated, this invention provides hydraulically actuated means for reciprocating the tool-head. This means comprises a hydraulic motor A consisting of a cylinder 20 supported by the column C and a piston 21 fitted therein. The piston is connected to one end of a piston rod 22 which has its other end secured to said head.

Likewise, a hydraulic motor F, comprising a cylinder 23 and a piston 24, is provided for reciprocating the rack-bar 18, to effect the indexing movements of the work-carrier. The piston 24 is secured upon a suitable piston rod 25 operatively connected with the rack-bar 18 and which, for convenience of manufacture, may be formed integral therewith.

This invention also provides an improved hydraulic system for furnishing fluid pressure to actuate the motors A and F and improved valve mechanisms D and E, respectively, for controlling the action thereof. The improved system comprises a reservoir R located within the base B and adapted to hold a supply of oil or other suitable actuating fluid. A single continuously driven pump P is connected by a pipe 26 with the reservoirs and receives oil therefrom. A conduit 27 is connected with the exhaust side of the pump, and branch-lines 27ª and 27ᵇ connect the conduit 27 with the valves D and E respectively. The pump P is designed to pass oil at a volumetrically uniform rate to supply the conduit system and the motor A and F with fluid under sufficient pressure to effect translation of the tool-head and indexing movements of the work-carrier. To limit the maximum pressure in the hydraulic system there is provided a suitable relief-valve controlled by-pass for the oil ejected by the pump. This by-pass and relief-valve are designed generally as x in Figs. 3 and 4. It will be understood that the relief-valve is set to open when a predetermined pressure has been built up in the hydraulic system and that after it has opened it will return to the reservoir the oil passed by pump, maintaining, in the system, the predetermined pressure. A valve 28, in the conduit 27, serves to regulate the rate of flow therethrough and thereby determines the rate at which the tool-head and work-carrier may be moved.

The pump P may be driven by any suitable means, such for example as that illustrated in Figs. 1 and 2. In these figures it is shown as driven from the motor M through bevel gear 5, hereinbefore mentioned, a similar gear 29 fixed to a stub shaft 30 and meshing with the gear 5; pulleys 31 and 32 on the shaft 30 and pump shaft $p$ respectively and a belt 33 entrained about said pulleys.

Oil, under pressure, in the branch-line 27$^a$ enters the casing 34 of the valve D and is transmitted alternately to conduits 35 and 36 and thence to the upper and lower ends respectively of the cylinder 20 by a sliding valve piston 37 within the casing. To effect rapid traverse and also slow feed of the tool-head the conduit 35 is preferably connected with the valve casing 34 by two separate lines 35$^a$ and 35$^b$ of unequal capacity, the line 35$^b$ being of lower capacity. This difference in capacity may be effected by inserting in the line a suitable valve 38 as shown in Figs. 1 and 2. A drain pipe 40 connects the valve casing 34 with the reservoir and returns thereto the oil exhausted from the cylinder 20 in opposite movements of the piston.

As shown in Fig. 3, the pressure conduit 27$^a$ is connected (by means of the reduced intermediate portion of the valve piston) with the conduit 36 which connects with the lower end of the cylinder 20 beneath the piston 21, thereby causing retraction of the tool-head from the work. As the piston 21 moves upwardly the oil thereabove is exhausted through the conduit 35 into the valve casing 34, downwardly through a central bore 37$^a$ in the valve piston 37 and then through the drain pipe 40 back to the reservoir. With the valve 37 in its uppermost position (as shown in Fig. 5) the pressure conduit 27$^a$ is connected with the upper end of the cylinder 20 through pipes 35$^a$ and 35$^b$ and rapid advance movement is given to the tool-head. During this movement oil beneath the piston 21 is exhausted through the conduits 36 and 40 back to the reservoir. At a predetermined point in the downward movement of the head the valve piston 37 is moved downwardly from the position shown in Fig. 5 to a position in which the head 37$^b$ of the piston closes the conduit 35$^a$ and fluid flows from the pressure line 27$^a$ to the conduit 35 only through the restricted passage 35$^b$ thereby reducing the rate of movement of the tool-head to a suitable feeding rate.

The valve piston 37 is secured upon a rod 41 and is automatically shifted to its rapid traverse position by means later to be described. Fixed upon the rod 41 is a collar 42 within the path of which are adapted to be moved the off-set ends of two spring pressed interference members 43 and 44. These members are slidingly mounted in a bracket 45 supported by the column C and, during the advance movement of the tool-head, are successively depressed by dogs 46 and 47, respectively, adjustably carried by the tool-head. A spring 48, interposed between a bracket 49 fixed to the column and a collar 50 secured upon the rod 41 constantly tends to move the rod downwardly to shift the valve piston to the position shown in Fig. 3 in which it effects retractive movement of the tool-head.

The index control valve E comprises a cylinder 51 within which is slidingly fitted a valve piston 52 formed with a reduced intermediate portion 53. This piston is fixed to a slide-rod 54 and serves, in its two effective positions, first to admit fluid under pressure from the branch line 27$^b$ to a conduit 55 connecting the cylinder 51 with one end of the cylinder 23, as shown in Fig. 4, and second to connect the branch line 27$^b$ with a conduit 56 connecting the cylinder 51 with the other end of the cylinder 23 as shown in Fig. 3. In the position illustrated in Fig. 4 oil under pressure flows into the forward end of the cylinder 23 thereby pushing the piston 24, piston rod 25 and its attached rack-bar 18 rearwardly and rotating the sleeve 17 and pawl 15 clockwise, the pawl in this movement idly riding over the teeth of the ratchet wheel 14 thereby setting the parts in a position subsequently to effect an indexing movement of the work-carrier. During this movement of the piston oil in the rear end of the cylinder is exhausted through the conduit 56 into the cylinder 51 and thence through a drain pipe 40$^a$ back to the reservoir. When the valve piston 52 is shifted to the position shown in Fig. 3 oil under pressure flows from the branch-line 27$^b$ through the conduit 56 into the rear end of the cylinder 23 thereby pushing the piston 24, rod 25 and rack-bar forwardly, rotating the sleeve 17 and pawl 15 counterclockwise and effecting an index movement of the ratchet-wheel and the work-carrier; oil in the forward end of the cylinder 23 being exhausted through conduit 55, bore 52$^a$ in the valve piston 52, and drain 40$^a$ back to the reservoir. A spring detent 57 co-operates with a dog 58 on the slide rod 54 yieldingly to maintain the rod and valve piston in either of their two effective positions.

As hereinbefore stated, the valve E is adapted automatically to be actuated, to effect indexing movements of the work-carrier, by the movement of the tool-head, and likewise the valve D is adapted to be actuated, to initiate a cycle of the tool-head, by the action of the indexing mechanism. To that end, the rod 54 is connected at one end, to one arm of a bell-crank lever 59 fulcrumed at 60, on the machine base and having its other arm connected to a rod 61 slidingly fitted in bearing 62 provided by the column. A collar 63, secured upon the rod 61, is adapted, upon upward movement of the tool-head, to be engaged by a spring-pressed dog 64 slidingly fitted within a bracket 65 fixed to the tool-head. This effects upward movement of the rod, which through the action of the bell-crank lever, shifts the valve piston 52 to the position shown in Fig. 4 to initiate an indexing movement. As the tool-head approaches its uppermost position the dog 64 engages a stationary cam 66 which depresses the dog and causes it to release the collar 63, thereby permitting the rod 61 to be moved downwardly by means later to be described.

The automatic means for shifting the valve piston 37 to effect advance movement of the head comprises a rod 67 having one end slidingly fitted within an arm 68 connected with the piston rod 25 and having its other end connected with one arm of a bell-crank lever 69 fulcrumed upon a pin 70 sustained by the column. The other arm of the bell-crank lever carries a spring-pressed pawl 71 adapted, upon clockwise movement of the lever to snap beneath a collar 72, as shown in Fig. 3, and upon counter-clockwise movement of the lever, to elevate the rod, in opposition to the spring 48, whereupon the collar 42 is moved out of contact with the interference members 43 and 44. Those members then automatically move into the path of said collar to prevent its return under the action of the spring 48 until the members have been shifted by the dogs 46 and 47 as previously described. Extreme counterclockwise movement of the bell-crank lever 69 causes the bevelled upper end 71ª of the pawl 71 to engage a fixed pin 73 which causes the pawl to be tipped back out of the path of the collar 72 to permit the collar 72 and rod 41 to be depressed as the interference members 43, 44 are retracted.

Operation

The automatic operation of the hydraulic system, and consequently the machine-tool, is as follows:—In Fig. 4 the parts are in the positions which they occupy at the completion of a cycle i. e. the head is fully retracted and the valve piston 52 is set to initiate an actuation of the indexing mechanism. In this position of the valve piston oil under pressure flows from the branch line 27ᵇ through the pipe 55 into the forward end of the cylinder 23 thereby forcing the piston 24 and the parts connected therewith into the positions shown in Fig. 3. This movement resets the pawl 15 relative to the ratchet wheel, causes the arm 68 to engage and shift the rod 54, thereby shifting the valve piston 52 to the position wherein it connects the branch-line 27ᵇ with the conduit 56, and causes the arm 68 also to shift the rod 67 to the left by engaging a collar 67ª thereon, thus rocking the bell-crank lever 69 clockwise and placing the pawl 71 beneath the collar 72. Oil under pressure now flows into the left end of the cylinder 23 forcing the piston 24 and the parts connected therewith to the right, thereby rotating the pinion 19, sleeve 17 and pawl 15 counterclockwise and indexing the work-carrier. Upon the extreme outward movement of the piston rod 25 i. e. at the completion of the indexing movement the arm 68 engages a collar 67ᵇ on the rod 67, moving the rod to the right, swinging the bell-crank lever counterclockwise and causing the pawl 71 to engage the underside of the collar 72 and shift the rod 41 axially. This movement of the rod shifts the valve piston 37 into the "rapid traverse down" position shown in Fig. 5 where it is held temporarily by the action of the interference member 43. The head now descends rapidly until the dog 46 shifts the interference member 43, whereupon the rod 41 and valve piston 37 are shifted downwardly until the collar 42 engages the interference member 44. This position of the valve effects slow downward feed of the head. After a predetermined feeding movement has been given to the head the dog 47 shifts the interference member 44 out of the path of the collar 42 thereby permitting the valve-piston to be moved to the position shown in Fig. 4 to effect retractive movement of the tool-head.

It is to be understood that one, two or more sets of spindles may be provided and that indexing movements of any desired degree (within certain limits) may be given to the work-carrier. In the machine illustrated two sets of spindles are provided and the work-table is indexed 90 degrees, thereby presenting each work-piece to the action of each of the two sets of tools.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A continuously acting hydraulically operated machine tool combining a translatable head; a rotatable member; a hydraulic motor and mechanical connections for giving to said head advance and retractive movements; indexing mechanism for giving to said rotatable member step-by-step rotary movements; a hydraulic motor and mechanical connections for actuating said indexing mechanism; an oil reservoir; a pump; a conduit interconnecting said reservoir, pump, and both of said motors; a first valve controlling the flow of oil to the head-translating motor; a second valve controlling the flow of oil to the indexing motor; means actuated by the head in its retractive movement to actuate the index control valve to initiate an indexing movement of said member; means actuated by the movement of the index mechanism to actuate the head controlling valve to effect advance movement of the head; and means rendered effective by the advance movement of the head to actuate the head controlling valve to effect retractive movement of the head.

2. A machine tool combining a translatable tool-head; a rotary work-support; a hydraulic motor mechanically connected to said tool-head to translate the latter; indexing means for said work-carrier; a hydraulic motor mechanically connected to actuate said indexing means; a reservoir; a fluid pressure system comprising a pump and piping for transmitting oil under pressure from said reservoir to said motors; a valve in said system for controlling the direction of translation of said tool-head; means actuated by said indexing mechanism as it completes its operation, to actuate said valve to effect forward movement of the tool-head; and means rendered operative by the tool-head, in its forward movement, to actuate said valve to effect retractive movement of the tool-head.

3. A machine tool combining a reciprocating tool-carrier; a rotary work-carrier; a hydraulic motor mechanically connected to said tool-carrier to reciprocate the latter; indexing mechanism for rotating said work-carrier; a hydraulic motor mechanically connected to said indexing mechanism; a single pump for passing oil at a volumetrically uniform rate; a reservoir; a conduit system interconnecting said reservoir, single pump and both of said hydraulic motors; a valve controlling the flow of oil to the tool-carrier reciprocating motor; a valve controlling the flow of oil to the work-carrier indexing motor; means actuated by the movement of the tool-carrier to actuate the index control valve; and means actuated by the movement of the indexing mechanism to actuate the tool-carrier control valve.

4. A machine tool combining a reciprocable tool-head; a rotatable work-carrier; indexing mechanism for said work-carrier; a hydraulic motor and mechanical connections for reciprocating said tool-head; a hydraulic motor for actuating said indexing mechanism, a single fluid pressure system connected with both of said motors; a valve embodied in said system and controlling the flow of fluid to said tool-head reciprocating motor; a second valve embodied in said system controlling the flow of fluid to said work-carrier indexing motor; means actuated by the movement of the tool-head to actuate the index control valve; and means actuated by the movement of the indexing mechanism to actuate the tool-head control valve.

5. A machine tool combining a reciprocable head; a rotary carrier; a hydraulic motor and mechanical connections for reciprocating said head; ratchet and pawl mechanism for indexing said carrier; a second hydraulic motor; a rack and pinion actuated by the last named motor and operatively connected with said ratchet and pawl mechanism to actuate the latter; a single fluid pressure system connected with both of said motors; a valve mechanism controlling the flow of fluid to each of said motors; means actuated by the retractive movement of the head to actuate the index control valve to effect retraction of the piston of said second motor and resetting of the ratchet and pawl mechanism preparatory to an indexing movement; and means actuated during the resetting movement of the ratchet and pawl mechanism to shift the index control valve to a position to effect an advance movement of the piston of said second motor and thereby actuation of said index mechanism.

6. A machine tool combining a reciprocable tool-head; hydraulically actuated means to reciprocate said tool-head; a valve controlling the flow of fluid to said means; a rotatable work-carrier; indexing mechanism for giving to said work-carrier indexing movements; a hydraulic motor connected to actuate said indexing mechanism a fluid pressure line connected with said motor; a second valve controlling the flow of fluid to said motor and controlling the actuation of said indexing mechanism; means actuated by said tool-head to shift said second valve to initiate an indexing movement of said work-carrier; and means actuated by the movement of the indexing mechanism to actuate the first named valve.

7. A machine tool combining a reciprocable head; a rotatable carrier; means to index said carrier; a hydraulic motor mechanically connected to reciprocate said head; a fluid pressure line connected with said motor; a valve embodied in said line and adapted to determine the direction of movement of said head; means actuated by said indexing means to shift said valve to effect advance movement of said head; means to retain the valve in its shifted position; means actuated by said head in its advance movement to render said retaining means ineffective; and means active thereafter to shift the valve to a position to effect retractive movement of said head.

8. A machine tool combining a base; an upright column; a tool-head translatably mounted on said column; means to translate said tool-head; a rotary work-carrier supported by said base; indexing means including a ratchet wheel and a pawl for giving to said table step-by-step rotary movements; a hydraulic motor mechanically connected to give to said indexing means indexing and resetting movements; a fluid pressure system delivering actuating fluid to said motor; a valve controlling the flow of fluid to the index actuating motor; an actuating rod connected with said valve; a control rod extending lengthwise of said column; an operative connection between said rods; means actuated by the movement of the head to shift said control rod to effect an initial setting of the index control valve thereby to effect retraction of the pawl relative to the ratchet wheel and resetting movement of the indexing means; and means actuated by the resetting movement of the index mechanism to shift said valve to effect advance movement of said pawl.

9. A machine tool combining a reciprocable tool-carrier; a rotatable work-carrier; a hydraulic motor mechanically connected to actuate each of said carriers; a fluid pressure system connected with both of said motors; valves controlling the flow of fluid to said motors; means normally acting upon one of said valves tending to shift it to a position to effect retraction of the tool-carrier, said means including a shiftable rod and means tending to shift it in one direction; mechanism actuated by the movement of said tool-carrier to shift another valve to a position to effect resetting of said index mechanism; means actuated by the indexing mechanism in its resetting movement to shift the last named valve to a position to effect completion of the index movement; a slide rod operatively connected to said shiftable rod; and means actuated by the index actuating mechanism to move said slide rod thereby to shift the tool-carrier control-valve to effect advance movement of the tool-carrier.

In witness whereof, I hereunto subscribe my name.

ROBERT M. GALLOWAY.